US008675883B2

(12) United States Patent
Birkenes (10) Patent No.: US 8,675,883 B2
(45) Date of Patent: Mar. 18, 2014

(54) APPARATUS AND ASSOCIATED METHODOLOGY FOR SUPPRESSING AN ACOUSTIC ECHO (75) Inventor: Oystein Birkenes, Oslo (NO)

(73) Assignee: Cisco Technology, Inc., San Jose, CA (US)

(*) Notice: Subject to any disclaimer, the term of this patent is extended or adjusted under 35 U.S.C. 154(b) by 438 days.

(21) Appl. No.: 13/008,651

(22) Filed: Jan. 18, 2011

(65) Prior Publication Data

US 2011/0176687 A1 Jul. 21, 2011

Related U.S. Application Data (60) Provisional application No. 61/296,534, filed on Jan. 20, 2010.

(30) Foreign Application Priority Data

Jan. 18, 2010 (NO) .................................. 20100081

(51) Int. Cl.
H04B 3/20 (2006.01)

(52) U.S. Cl.
USPC .................. 381/66; 381/83; 381/93; 381/95; 381/96; 379/406.01; 379/406.02; 379/406.03; 379/406.04; 379/406.05; 379/406.06; 379/406.07; 379/406.08; 379/406.09; 379/406.11; 379/406.12; 379/406.13; 379/406.14; 379/406.15; 379/406.16; 84/707

(58) Field of Classification Search
USPC .................................. 381/66, 83, 93, 95, 96; 379/406.01–406.16; 84/707
See application file for complete search history.

(56) References Cited

U.S. PATENT DOCUMENTS

| 6,249,581 | B1* | 6/2001 | Kok | 379/406.16 |
| 7,813,499 | B2* | 10/2010 | Chhetri et al. | 379/406.14 |
| 2006/0222172 | A1 | 10/2006 | Chhetri et al. | |
| 2009/0214048 | A1* | 8/2009 | Stokes et al. | 381/66 |
| 2009/0238373 | A1 | 9/2009 | Klein | |
| 2010/0013987 | A1* | 1/2010 | Edler et al. | 348/425.2 |
| 2011/0044461 | A1* | 2/2011 | Kuech et al. | 381/66 |

FOREIGN PATENT DOCUMENTS

| WO | WO 2006/111370 A1 | 10/2006 |
| WO | WO 2009/092522 A1 | 7/2009 |

OTHER PUBLICATIONS

Christof Faller et al., "Suppressing Acoustic Echo in a Spectral Envelope Space," IEEE Transactions on Speech and Audio Processing, vol. 13, No. 5, Sep. 1, 2005, XP011137551, pp. 1048-1062.

Carlos Avendano, "Acoustic Echo Suppression in the STFT Domain," IEEE Workshop on Applications of Signal Processing to Audio and Acoustics, Oct. 21-24, 2001, pp. 175-178.

(Continued)

Primary Examiner — Davetta W Goins
Assistant Examiner — Kuassi Ganmavo
(74) Attorney, Agent, or Firm — Oblon, Spivak, McClelland, Maier & Neustadt, L.L.P.

(57) ABSTRACT

A new acoustic echo suppressor and method for acoustic echo suppression is described herein. Exemplary embodiments of the acoustic echo suppressor use one linear regression model for each subband. The linear regression model for each subband may operate on the squared magnitude of the input samples as well as corresponding cross-products. In this way, accurate and robust estimates of the echo signal in each subband can be obtained, thereby providing good echo reduction while keeping the signal distortion low.

16 Claims, 8 Drawing Sheets (56) References Cited

OTHER PUBLICATIONS

Amit S. Chhetri et al., "Regression-Based Residual Acoustic Echo Suppression," International Workshop on Acoustic Echo and Notice Control, Sep. 12, 2005, XP002591308, 4 pages.

Jyun-ichiro Tomita, "Acoustic Echo Cancellation Using Gaussian Processes," ICONIP 2008, vol. 5507, Nov. 25, 2008, XP002591309.

Jyun-ichiro Tomita et al., "Acoustic Echo Cancellation Using Gaussian Processes," ICONIP 2008, Part II, vol. 5507, Nov. 28, 2008, XP002591310, pp. 353-360.

Norwegian Search Report and International Search Report in Application No. 20100081.

* cited by examiner

APPARATUS AND ASSOCIATED METHODOLOGY FOR SUPPRESSING AN ACOUSTIC ECHO

CROSS-REFERENCE TO RELATED APPLICATIONS

The present application claims the benefit of provisional application 61/296,534, filed on Jan. 20, 2010, the entire contents of which are hereby incorporated by reference. The present application also claims the benefit of priority under 35 U.S.C. 119 to Norwegian Patent Application NO20100081, filed Jan. 18, 2010, the entire contents of which are hereby incorporated by reference.

TECHNOLOGICAL FIELD

Embodiments described herein relate to echo suppression. In particular, the embodiments described herein relate to echo suppression utilizing a linear regression module for each subband that may operate on the square of input samples as well as corresponding cross-products in order to generate an estimate of the squared magnitude of the subband echo signal.

BACKGROUND

A common problem in a hands free communication system is acoustic echo, and the problem can be formulated as follows. A digital input audio signal x(n) is received by a communication interface from a far-end site over a network such as the Internet or PSTN and played on a loudspeaker. A microphone generates a digital audio signal y(n) composed of an echo signal u(n) and a near-end sound signal v(n) such as speech from a near-end talker and background noise. The echo signal is composed of the direct signal and reflected versions (reflected by walls/ceilings etc.) of the loudspeaker signal. The microphone signal y(n) may be expressed as follows:

$$y(n)=u(n)+v(n). \qquad (1)$$

If the microphone signal y(n) were transmitted back to the far-end unmodified, the participants at the far end site would hear an echo of themselves, and if a similar system were present at the far-end site, even howling/feedback might occur.

Figure 1:
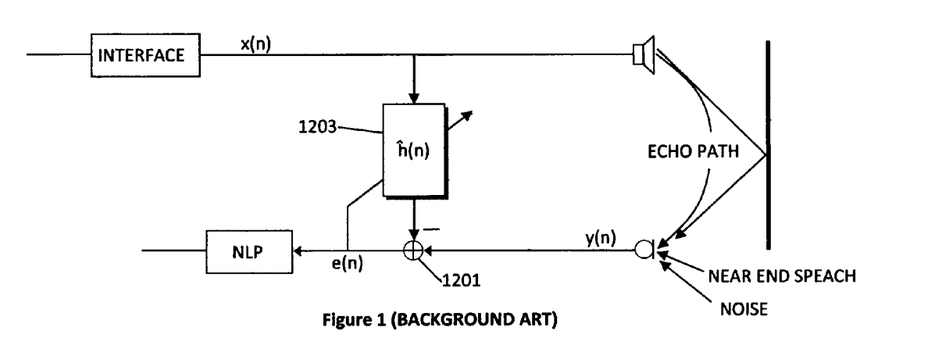
FIG. 1 illustrates a conventional echo problem in a hands free communication system.

One way to attenuate the echo signal is illustrated in FIG. 1, and is commonly referred to as acoustic echo cancellation (AEC). Here the room impulse response from the loudspeaker to the microphone (including the response of the loudspeaker and the microphone, and digital-to-analog and analog-to-digital converters which are not shown for simplicity) is modeled with an adaptive finite impulse response (FIR) filter with L coefficients given in the vector $h(n)=[\hat{h}_0(n), \hat{h}_1(n), \ldots, \hat{h}_{L-1}(n)]^T$. An adaptive algorithm such as normalized least mean squares (NLMS) or recursive least squares (RLS) are used to continuously update the filter coefficients with the goal of approximating the room impulse response as accurately as possible. The closer the estimated filter is to the room impulse response, the better the estimated echo is, and the less echo is sent back to the far-end. However, due to the changing nature of the room impulse response as well as the near-end sound appearing on the microphone, there will always be some residual echo left after subtracting the estimated echo signal. Therefore, it is common to use a nonlinear processing (NLP) block to further suppress remaining echo.

In the full-band acoustic echo cancellation scheme of FIG. 1, the adaptive filter 1203 generates an estimate û(n) of the echo signal u(n). This estimated echo signal û(n) is subtracted from the microphone signal y(n) at node 1201 to generate the echo cancelled output signal e(n), according to Equation (2) as follows:

$$e(n)=y(n)-\hat{u}(n). \qquad (2)$$

For wideband audio and typical rooms the echo canceller in FIG. 1 requires a large number of filter coefficients in order to work satisfactory. This renders the echo canceller very computationally complex, even for simple adaptive algorithms such as NLMS. Moreover, even if computational complexity is of little concern, many of the most commonly used adaptive algorithms would suffer from slow convergence speed due to the high auto-correlation present in the signal x(n).

Figure 2:
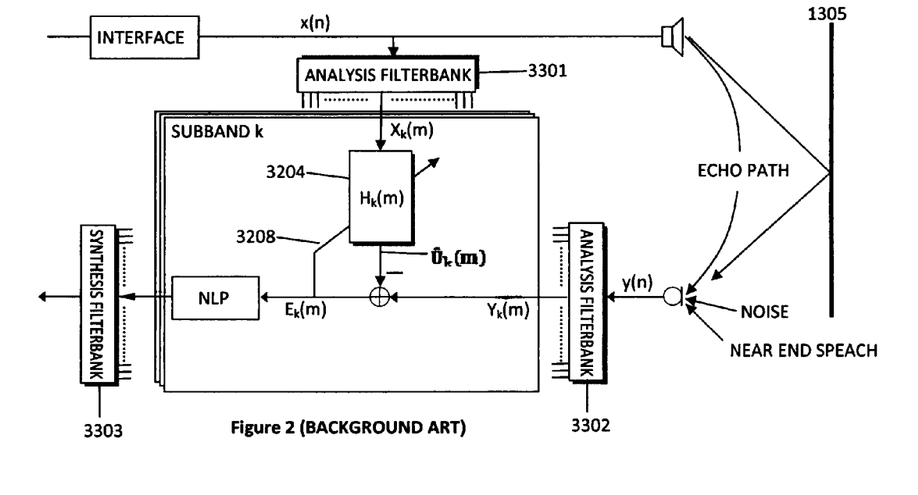
FIG. 2 is a schematic drawing of a conventional subband acoustic echo canceller.

These problems are greatly reduced in the subband acoustic echo canceller illustrated in FIG. 2. In FIG. 2 the digital input signal x(n) received from the far-end, and passed to the loudspeaker, is divided into a predetermined number K of subbands $X_1(m), \ldots, X_K(m)$ using the analysis filterbank 3301, where m represents a time index. The microphone signal y(n) is also divided into K subbands $Y_1(m), \ldots, Y_K(m)$ using a similar analysis filterbank 3302. For each subband, e.g. subband k, a subband reference signal $X_k(m)$ is filtered through a subband FIR filter $H_k(m)$ 3204 that calculates a subband echo estimate $\hat{U}_k(m)$. The subband echo estimate $\hat{U}_k(m)$ is subtracted from the corresponding subband microphone signal $Y_k(m)$ at node 2110 to create a subband echo cancelled microphone signal $E_k(m)$. The echo cancelled microphone subband signal $E_k(m)$ is used for adapting the FIR filter 3204, shown as the subband FIR filter update loop 3208. The echo cancelled microphone sub-band signals $E_1(m), \ldots, E_K(m)$ from all subbands are merged together to form a full band echo cancelled microphone signal by the synthesis filterbank 3303.

The narrow bandwidth of the frequency subbands allows for downsampling in the analysis filterbank. After downsampling, all subband processing run on a smaller rate, the number of coefficients of the adaptive filter in each subband are greatly reduced, and the loudspeaker subband signals $X_k(m)$ has a lower auto-correlation compared to the fullband signal x(n). Compared to the system in FIG. 1, the system in FIG. 2 has lower computational complexity and faster convergence speed for many of the most commonly used adaptive algorithms. However, the acoustic echo cancellation systems in FIG. 1 and FIG. 2 do not work well during rapid changes in the phase response of the room impulse response. Such changes frequently occur on personal computers due to incorrect synchrony between the loudspeaker signal x(n) and the microphone signal y(n).

Modern acoustic echo suppression was proposed as a robust alternative to AEC in Carlos Avendano, *Acoustic Echo Suppression in the STFT Domain*, IEEE Workshop on Applications of Signal Processing to Audio and Acoustics 2001, pages W2001-4, the subject matter of which is incorporated herein by reference. The reference will hereafter be referred to as [Avendano, 2001].

Figure 3:
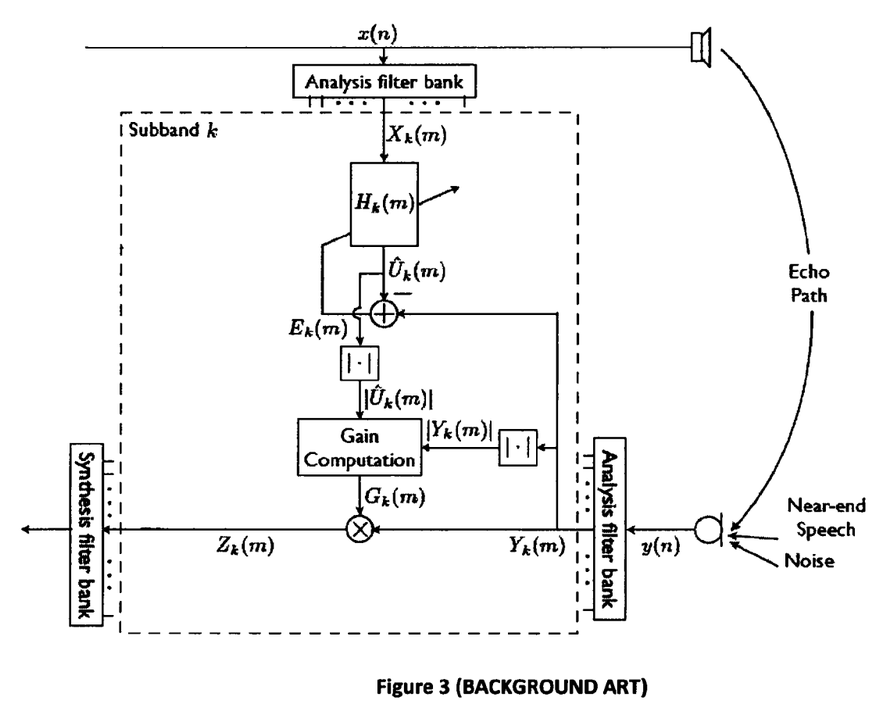
FIG. 3 is a schematic drawing of a conventional acoustic echo suppression system.

FIG. 3 illustrates the approach. As with subband echo cancellation, analysis filterbanks and a synthesis filterbank are used, so that processing can be done independently and efficiently on each subband. In the following, we consider only subband number k, while keeping in mind that the same processing is done for all the other subbands. Unlike in subband echo cancellation, where the complex subband echo signal $\hat{U}_k(m)$ is estimated, only the magnitude $|\hat{U}_k(m)|$ of the subband echo signal is needed in the acoustic echo suppression approach proposed in [Avendano, 2001]. The echo magnitude in subband k is formed by taking the magnitude of the complex echo estimate. The estimated echo magnitude is used to compute a time-varying subband gain defined as:

$$G_k(m) = \left( \frac{|Y_k(m)|^\alpha - \beta |\hat{U}_k(m)|^\alpha}{|Y_k(m)|^\alpha} \right)^{1/\alpha}, \quad (3)$$

where the parameters α and β are used to control the amount of echo reduction versus signal distortion. The output $Z_k(m)$ in subband k is formed by multiplying $Y_k(m)$, which is the microphone signal in subband k, with the gain $G_k(m)$. Often it is necessary, especially if the magnitude estimator is poor, to smooth the gains $G_k(m)$ over either frequency or time. For an example of gain smoothing see [Faller and Chen, 2005]. Note that in (3) the phase of the echo estimate $\hat{U}_k(m)$ is not used. This is an important feature for phase robustness. However, full robustness against phase variation is only achieved if the spectral magnitude estimator is robust. It is easy to see that the estimator in [Avendano, 2001] is not robust against phase changes. Consider for example what happens after a delay is introduced in the room impulse response. Then all the adaptive filter coefficients will be misaligned due to the changed phase and the adaptive filter must re-adapt.

A phase-robust acoustic echo suppressor was presented in Christof Faller and J. Chen, (2005), Suppressing acoustic echo in a spectral envelope space, IEEE Trans. Speech and Audio Processing, Vol 5, No. 13: page 1048-1062, hereafter reffered to as [Faller and Chen, 2005], the subject matter of which is incorporated herein by reference. Unlike the approach in [Avendano, 2001], where the echo magnitude in each subband is estimated from a sequence of complex subband samples, the approach in [Faller and Chen, 2005] aims at estimating the spectral envelope of the echo signal from the spectral envelope of the loudspeaker signal. In their work, the spectral envelope is taken to be the instantaneous power spectrum or magnitude spectrum smoothed over frequency. However, although this approach yields a fully phase-robust echo suppressor, the accuracy of the estimator is poor, even for a high number of adaptive filter coefficients. U.S. Pat. No. 7,062,040 to Faller also describes suppression of an echo signal, the entire contents of which is hereby incorporated by reference.

SUMMARY

Described herein is a method for processing an audio signal executed by an audio echo suppression apparatus. An exemplary embodiment of the method may include: receiving an input signal, wherein the input signal is applied to a speaker, dividing the input signal into a plurality K of subband input signals, receiving a microphone signal generated by a microphone, and dividing the microphone signal into a plurality K of subband microphone signals, and calculating the squared magnitude of each of the K subband microphone signals.

The calculated squared magnitude of the K subband microphone signals and the K subband input signals may be applied to a linear regression module to generate estimates of the squared magnitude of a signal component in the subband microphone signal for each of the plurality K of subbands, wherein the signal component corresponds to sound generated by the speaker in response to the input signal and picked up by the microphone. Finally, the signal component in the subband microphone signals may be suppressed based on the estimates of the squared magnitude of a signal component and the squared magnitude of the subband microphone signals to generate a plurality K of subband output signals.

Other embodiments may include an echo suppression apparatus, and a computer readable storage medium encoded with instructions for suppressing an echo.

Other audio cancelation systems are described in U.S. Pat. Nos. 7,010,119, 7,315,619, 7,277,538, and 7,206,404, the entire contents of which are hereby incorporated by reference in their entirety.

BRIEF DESCRIPTION OF THE DRAWINGS

In order to make the embodiments described herein more readily understandable, reference is made to the accompanying drawings, wherein.

DETAILED DESCRIPTION

Reference will now be made in detail to exemplary embodiments of the present technological advancement, examples of which are illustrated in the accompanying drawings. Wherever convenient, similar reference numbers will be used throughout the drawings to refer to the same or like parts. The implementations set forth in the following description do not represent all implementations consistent with the present technological advancement. Instead, they are merely some examples of systems and methods consistent with the present technological advancement.

A new acoustic echo suppressor and method for acoustic echo suppression is described herein. Exemplary embodiments of the acoustic echo suppressor use one linear regression model for each subband. The linear regression model for each subband may operate on the squared magnitude of the input samples as well as corresponding cross-products. In this way, accurate and robust estimates of the echo signal in each subband can be obtained, thereby providing good echo reduction while keeping the signal distortion low.

Figure 4:
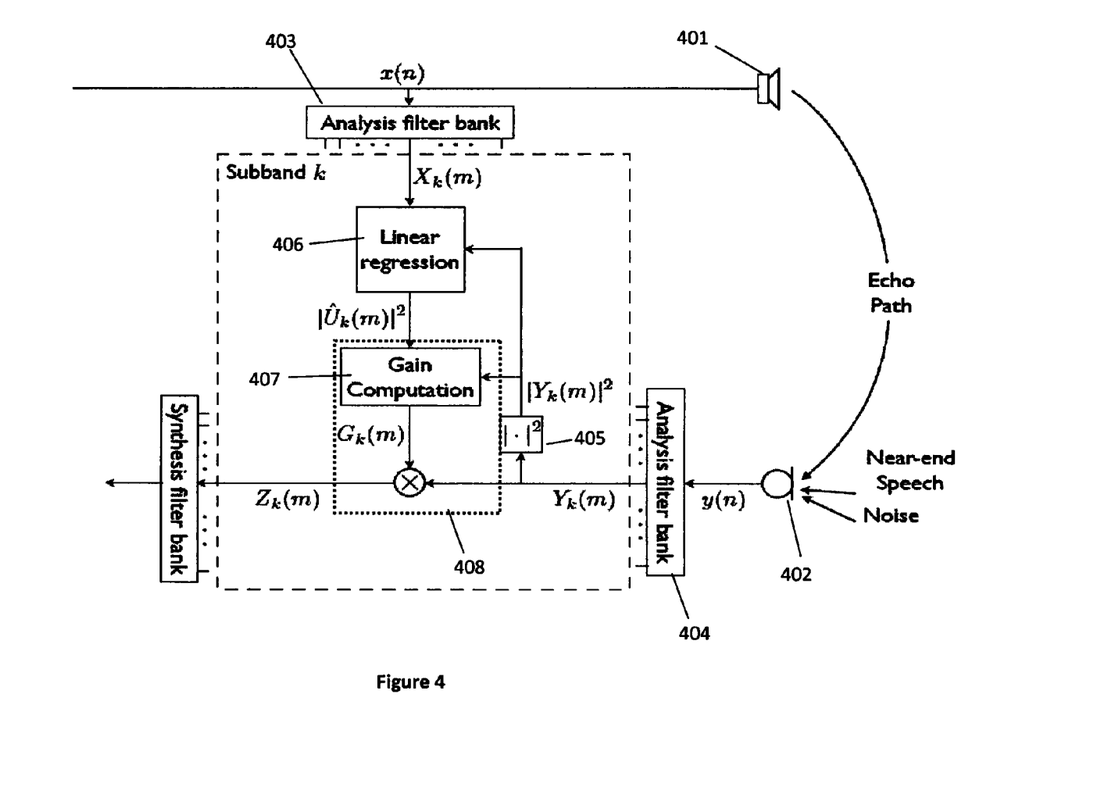
FIG. 4 illustrates an exemplary first embodiment of a spectral magnitude estimator.

The present technological advancement may be embodied as an echo suppression apparatus in a hands free telephony system. However, the present technological advancement can be embodied in any audio system where echo suppression is desired, such as video conferencing systems, and audio reproduction/recording systems. FIG. 4 schematically illustrates a system for suppressing echo and/or other signals corresponding to sound generated by a loudspeaker and picked up by a microphone. As in the conventional scheme of FIG. 3, an input audio signal x(n) is applied to a loudspeaker 401, while a microphone 402 generates a microphone signal y(n), which is composed of an echo signal u(n) (a signal component corresponding to sound generated by loudspeaker 401 and picked up by microphone 402) and near-end speech and background noise v(n). The loudspeaker signal x(n) and the microphone signal y(n) are divided into a plurality K of narrow frequency subbands with only small overlaps, using analysis filterbank 403 and analysis filterbank 404, respectively, creating subband input signals $X_k(m)$ and subband microphone signals $Y_k(m)$, where k denotes the subband number and m denotes the downsampled time index. An operator 405 computes the squared magnitude $|Y_k(m)|^2$ of the subband microphone signal $Y_k(m)$, which is used as an input signal to a linear regression module 406 and a gain computation module 407. The linear regression mudule 406 generates and outputs an estimate $|\hat{U}_k(m)|^2$ of the squared magnitude of the subband echo signal based on the subband signal $X_k(m)$ and the squared magnitude of the corresponding subband microphone signal $Y_k(m)$. The output of linear regression module 406 is used together with the squared magnitude of the corresponding subband microphone signal $Y_k(m)$ by echo suppression module 408 to suppress the echo in the subband microphone signal $Y_k(m)$. Depending on the implementation, echo suppression module 408 may perform any suitable echo suppression technique, such as those commonly used for noise suppression or speech suppression. According to one exemplary embodiment, the echo suppression module 408 comprises a gain computation module 407 to compute a time-varying subband gain defined as:

$$G_k(m) = \left( \frac{|Y_k(m)|^\alpha - \beta |\hat{U}_k(m)|^\alpha}{|Y_k(m)|^\alpha} \right)^{1/\alpha}, \quad (4)$$

where the parameters $\alpha$ and $\beta$ are used to control the amount of echo reduction versus signal distortion. The output $Z_k(m)$ in subband k is formed by multiplying $Y_k(m)$, with the gain $G_k(m)$.

Figure 5:
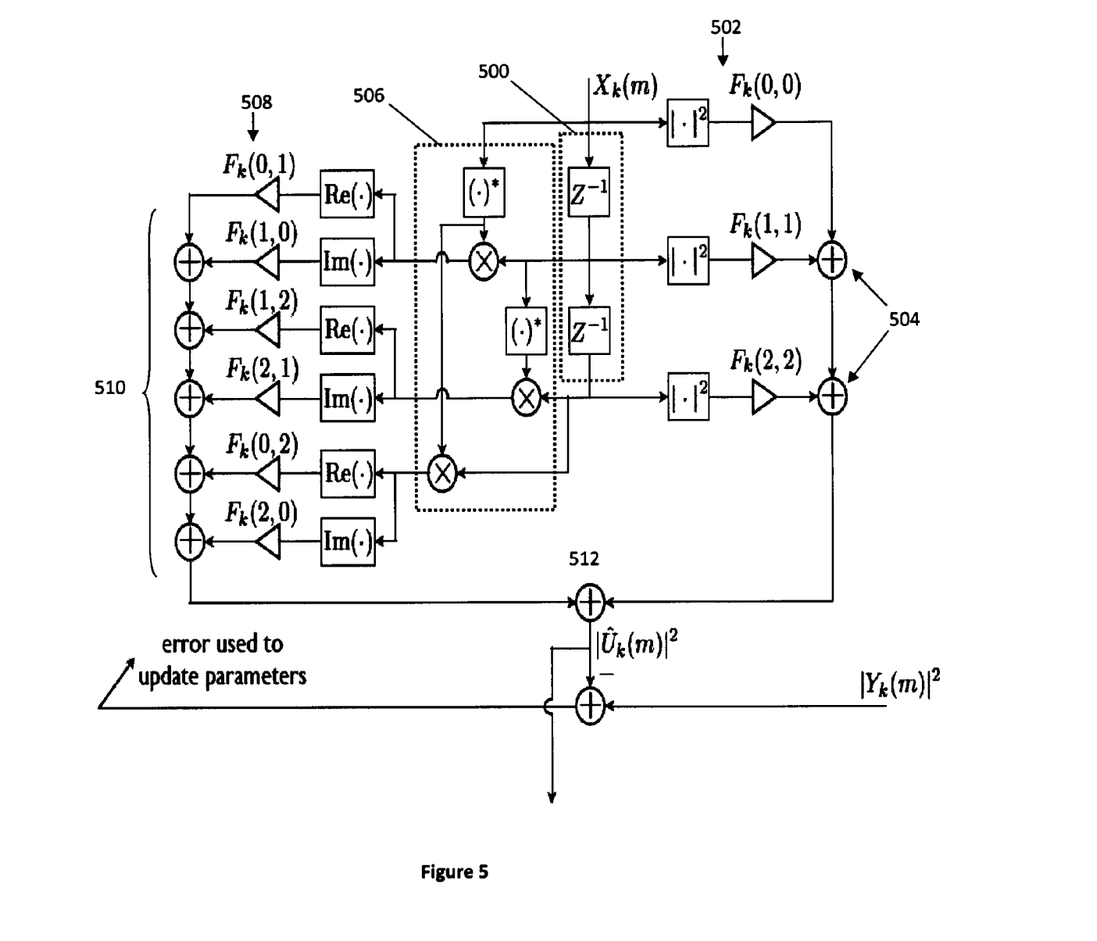
FIG. 5 illustrates an exemplary linear regression module usable with the spectral magnitude estimator of FIG. 4.

FIG. 5 schematically illustrates a linear regression mudule 406 according to one exemplary embodiment of the present technological advancement. Particularly, FIG. 5 is a block diagram illustrating an exemplary estimator of the squared magnitude of each subband echo signal embodying the present technological advancement. The discussion following for FIG. 5 refers to the echo suppression processing for one of the multiple frequency subbands. Analogous processing is performed for each of the other subbands. The linear regression module 406 will be discussed in more detail later. As long as the overlap between adjacent subbands is small, a good estimate for the complex echo signal in subband k can be obtained from an adaptive FIR filter. This is the echo estimate used in traditional subband acoustic echo cancellation (AEC). If the FIR filter has M complex coefficients denoted as $H_k(0), \ldots, H_k(M-1)$, the echo estimate in subband k is:

$$\hat{U}_k(m) = \sum_{i=0}^{M-1} H_k(i) X_k(m-i). \quad (5)$$

The echo suppressor, according to the exemplary embodiment shown in FIG. 5, estimates a squared magnitude of the complex echo estimate $\hat{u}_k(m)$, and this is done differently from the systems discussed in the background section. The above-noted equation (5) derives into an expression for the squared magnitude of $\hat{U}_k(m)$ that splits each term into two factors, where the first factor is a function of only $H_k(i)$, $i=0, \ldots, M-1$, whereas the second factor is a function only of the filter inputs $X_k(m-i)$, $i=0, \ldots, M-1$. This leads to an accurate and robust estimator of the squared magnitude of the subband echo signals. The squared magnitude of (5) can be written (equation 6):

$$|\hat{U}_k(m)|^2 =$$

$$\sum_{i=0}^{M-1} F_k(i,i) |X_k(m-i)|^2 + \sum_{i=0}^{M-1} \sum_{\substack{j=0 \\ j>i}}^{M-1} (F_k(i,j) \mathrm{Re}\{X_k^*(m-i)X_k(m-j)\} +$$

$$F_k(j,i) \mathrm{Im}\{X_k^*(m-i)X_k(m-j)\}),$$

where $$F_k(i,j) = \begin{cases} 2\mathrm{Re}\{H_k^*(i)H_k(j)\} & \text{if } j > i, \\ -2\mathrm{Im}\{H_k^*(i)H_k(j)\} & \text{if } j < i, \\ |H_k(i)|^2 & \text{if } j = i. \end{cases}$$

Taking the square of $|\hat{U}_k(m)|$ as shown in (6) provides a robust and accurate estimator $|\hat{U}_k(m)|^2$ of the squared magnitude of the complex echo estimate.

The expression in (6) can be recognized as a linear regression model where the set of regressors comprises the squared magnitude of the M latest input samples $X_k(m), \ldots, X_k(m-M+1)$ in addition to the real and imaginary parts of their mutual complex products, where for two complex numbers $z_1$ and $z_2$, the complex product is defined here as $z_1^* z_2$, i.e., the complex conjugate of the first number multiplied with the second number. For each regressor, there is a regression parameter denoted $F_k(i,j)$ according to (6).

Although the system of FIG. 5 is not a linear system, common adaptive algorithms such as, e.g., NLMS, APA, and RLS can be used as a control algorithm to update the regression parameters, because equation (6) is a linear function of the regressors. Thus, at each time index m, the regression parameters $F_k(i,j)$ are adjusted based on the set of regressors computed and the squared magnitude of the microphone signal in subband k. At each time instant m, the input to the linear regression module 406 of FIG. 5 is the loudspeaker reference sample $X_k(m)$ in subband k and the squared magnitude of the microphone sample $Y_k(m)$ in subband k. On some platforms there is a large delay in the echo path. Then, better performance of the linear regression is achieved if the input is delayed correspondingly, either in fullband or in subband. Although this delay is not always fixed, the delay can typically at any time be obtained from the operating system. If this is not the case, the delay may be estimated, e.g., as the one giving maximum cross-correlation between the loudspeaker signal and the microphone signal. Therefore, the subband loudspeaker reference sample $X_k(m)$ may be optionally delayed by d samples. d may be set to a fixed value, or it may vary as a function of time. In one exemplary embodiment, d is set as the delay between the loudspeaker and the microphone, such as the delay in a PC.

FIG. 5 shows a time lag module 500 formed by a sequence (M−1) of one-sample delay elements holding the input sample at different time lags (M=3 in FIG. 5). The input samples with different time lags in FIG. 5 may be expressed as $X_k(m)$, $X_k(m-1)$, and $X_k(m-2)$. The optional delay d may be used along with these time lags, wherein the input samples with different time lags may be expressed as $X_k(m-d)$, $X_k(m-d-1)$, and $X_k(m-d-2)$, wherein $d \in \{0, 1, 2, \ldots\}$.

For each time lag, the magnitude squared of the signal is computed followed by multiplication with a regression parameter $F_k(i,i)$ by combining module or modules. The results of the multiplication with the regression parameter $F_k(i,i)$ are added together by nodes 504 to form a first sum. Moreover, for any two time lags $X_k(m)$, $X_k(m-1)$, and $X_k(m-2)$, the complex product between the two signals is computed by a calculating module 506. The real and imaginary part of the complex product are each multiplied with a corresponding regression parameter $F_k(i,j)$ 508 and added together to form a second sum by combining module 508 and nodes 510. It is noted that combining modules 508 and 504 may be together or separate.

The estimate $|\hat{U}_k(m)|^2$ is then found as the sum of the first and second sums by estimator module 512.

An error signal $E_k(m)$ used to adaptively update the regression parameters $F_k(i, j)$ of the linear regression model 406 is generated by subtracting $|\hat{U}_k(m)|^2$ from the squared magnitude $|Y_k(m)|^2$ of the subband microphone sample $Y_k(m)$. This error signal $E_k(m)$ may be used to update the regression parameters $F_k(i,j)$ by using an adaptive algorithm such as, e.g., NLMS, APA, or RLS. The error signal $E_k(m)$ may be generated by linear regressor module 406 or another module.

The output of the linear regression module 406, which is the estimate $|\hat{U}_k(m)|^2$ of the square magnitude of the echo in subband k is passed to the gain computation module 407. The gain for subband k can then be calculated by using equation (4).

The linear regression module 406 used as the estimator for $|\hat{U}_k(m)|^2$ in (6) has $M^2$ real regressors and a corresponding number of real parameters. The example in FIG. 5 has M=3. Other values for M are possible. M may be selected in accordance with the availability of computational resources. Furthermore, embodiments of the present technological advancement are not limited to the use of all regressors and corresponding regression parameters $F_k(i,j)$ an for a given M. Any set of regressors as defined in (6) and corresponding regression parameters $F_k(i,j)$ may be used. In one exemplary embodiment, the set of regressors contributing most to the sum would be selected along with their corresponding regression parameters $F_k(i,j)$. This set may be selected based on the characteristics of the room impulse response, and thereby $H_k(i)$ and the characteristics of the input signal $X_k(m)$. A good set of regressors is important when limited computational resources only allow for a small set of regressors to be used.

In equation (6), regression parameters $F_k(i,j)$ for j>i attempt to estimate $2 \operatorname{Re}\{H^*_k(i)H_k(j)\}=2|H_k(i)||H_k(j)|\cos(\Psi_{H_k(j)}-\Psi_{H_k(i)})|$, where $\Psi_{H_k(i)}$ and $\Psi_{H_k(j)}$ are the phases of $H_k(i)$ and $H_k(j)$, respectively. Instead of trying to estimate the phase of each coefficient of the filter as in (5), the estimator in (6) estimates the phase difference between the coefficients $H_k(i)$. These differences are approximately unaltered after a change in delay of the room impulse response, even though the phases themselves have changed. The same analysis applies to the regression parameters $F_k(i,j)$ for j<i. This is the reason why the estimator of FIG. 5 is robust to phase changes.

In another embodiment, instead of estimating the squared magnitude of the echo signal in each subband, a smoothed squared magnitude of the subband echo signal $P_{\hat{U}_k}(m)$ can be estimated, wherein $$P_{\hat{U}_k}(m)=\gamma|\hat{U}_k(m)|^2+(1-\gamma)P_{\hat{U}_k}(m-1),$$

where $\gamma \in <0,1]$. The smoothed squared magnitude may be accurately estimated by replacing the regressors in (6) with smoothed squared magnitude and smoothed complex products. For example, the squared magnitude regressor $|X_k(m)|^2$ may be replaced by $$P_{X_k}(m)=\gamma|X_k(m)|^2+(1-\gamma)P_{X_k}(m-1),$$

and each cross product $X^*_k(m-i)X_k(m-j)$ may be replaced by $$C_{k,i,j}(m)=\gamma X^*_k(m-i)X_k(m-j)+(1-\gamma)C_{k,i,j}(m-1).$$

Figure 6:
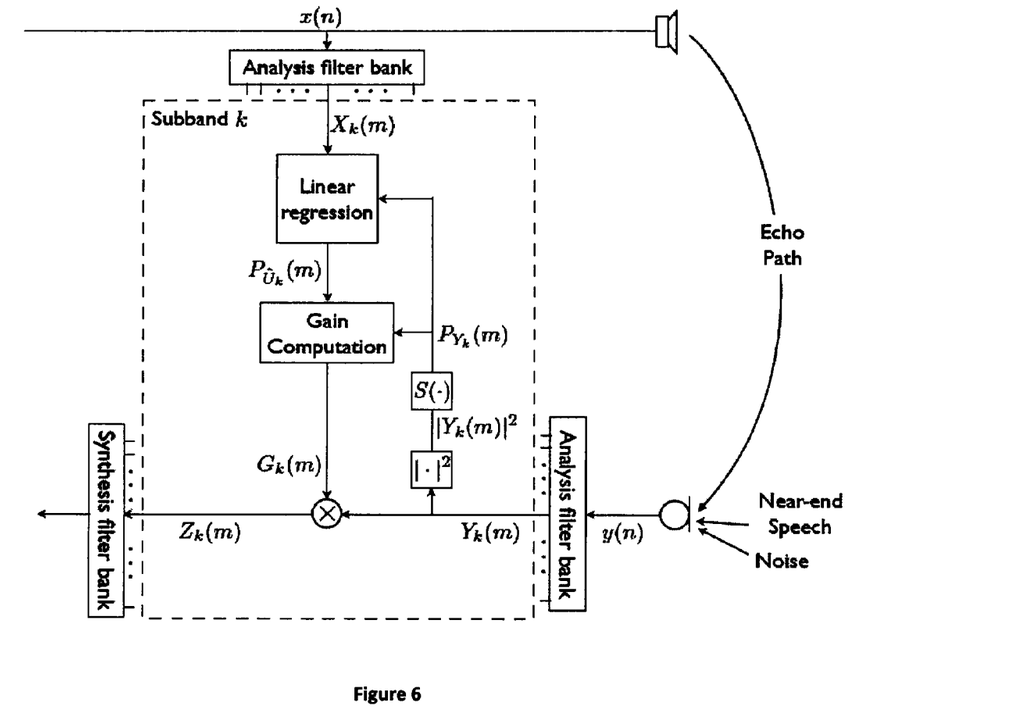
FIG. 6 illustrates an exemplary second embodiment of a spectral magnitude estimator.
Figure 7:
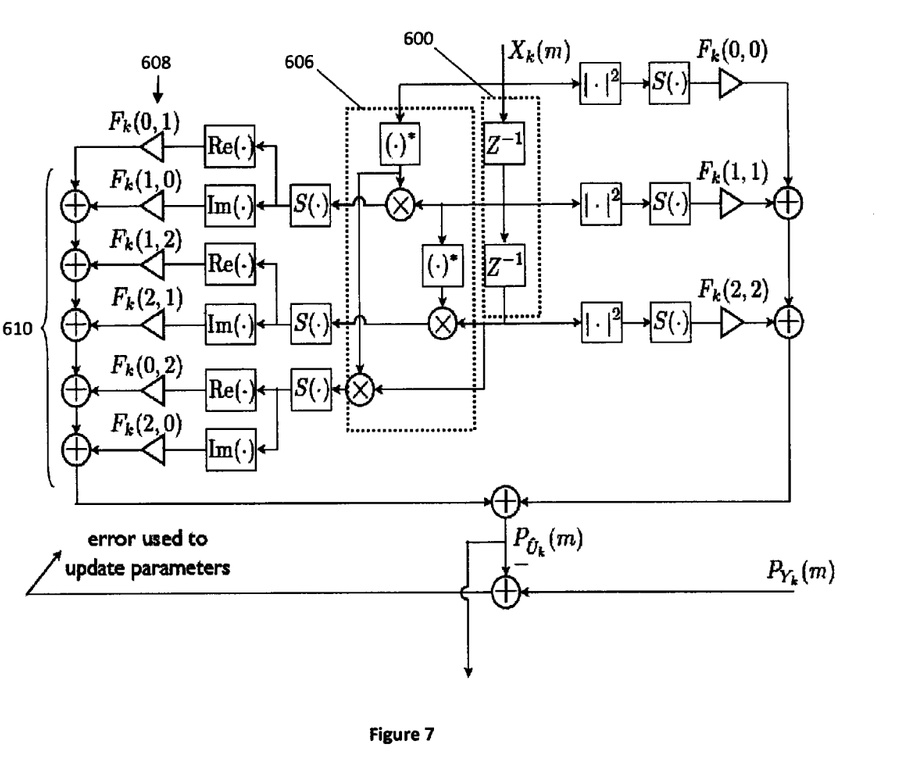
FIG. 7 illustrates an exemplary linear regression module usable with the spectral magnitude estimate of FIG. 6.

Each subband gain can then be computed by replacing $|U_k(m)|$ and $|Y_k(m)|^2$ in (4) with $P_{X_k}(m)$ and $C_{k,i,j}(m)$. $\sqrt{\hat{P}_{Y_k}(m)}$ respectively. For a small $\gamma$, the smoothed squared magnitude may well approximate the power of the input signal, and the smoothed complex products may well approximate cross-correlations. Since cross-correlations of large time-lags may be small in subbands of a filterbank, these regressors do not contribute much to the estimate and could be omitted. A block diagram of the acoustic echo suppressor incorporating the estimate of the smoothed squared magnitude of the echo signal is illustrated in FIG. 6. The operator $S(\bullet)$ is a smoothing operator, an example of which is given above. The corresponding linear regression is shown in FIG. 7, which includes time lag module 600, calculating module 606, regression parameter 608, and nodes 610.

It should be noted that, if $F_k(i,j)=0$, $j\neq i$, i.e., zero cross-parameters, the approach above looks similar to the approach in [Faller and Chen, 2005]. However, there are still some differences. In [Faller and Chen, 2005], the spectral envelope of the echo signal is estimated from the spectral envelope of the input signal. The spectral envelope of the input signal is computed by smoothing the squared magnitude of the subband loudspeaker samples over frequency. In the approach above, the subband loudspeaker samples are smoothed over time.

Figure 8:
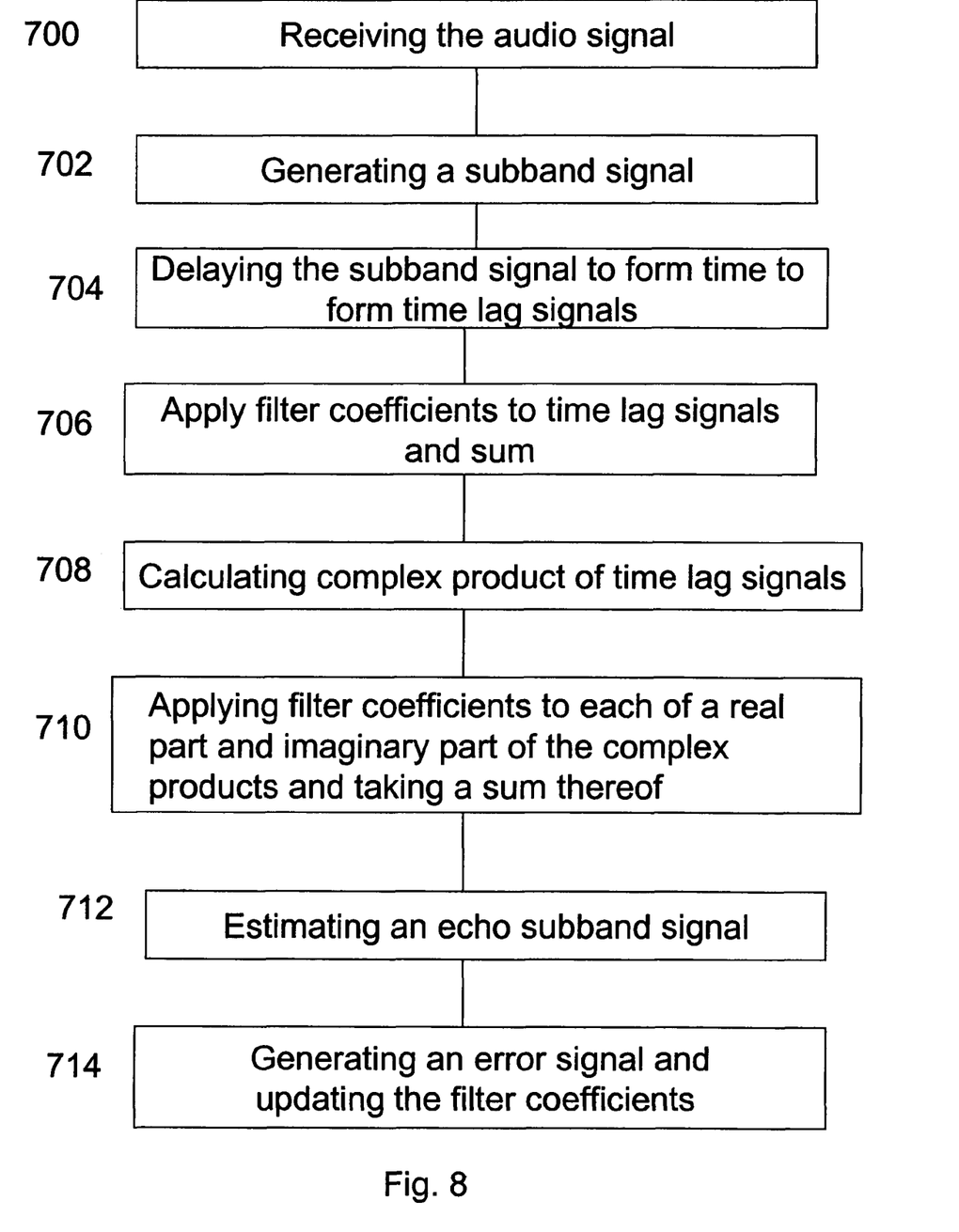
FIG. 8 is a flow chart illustrating an exemplary method embodying the present technical advancement.
Figure 9:
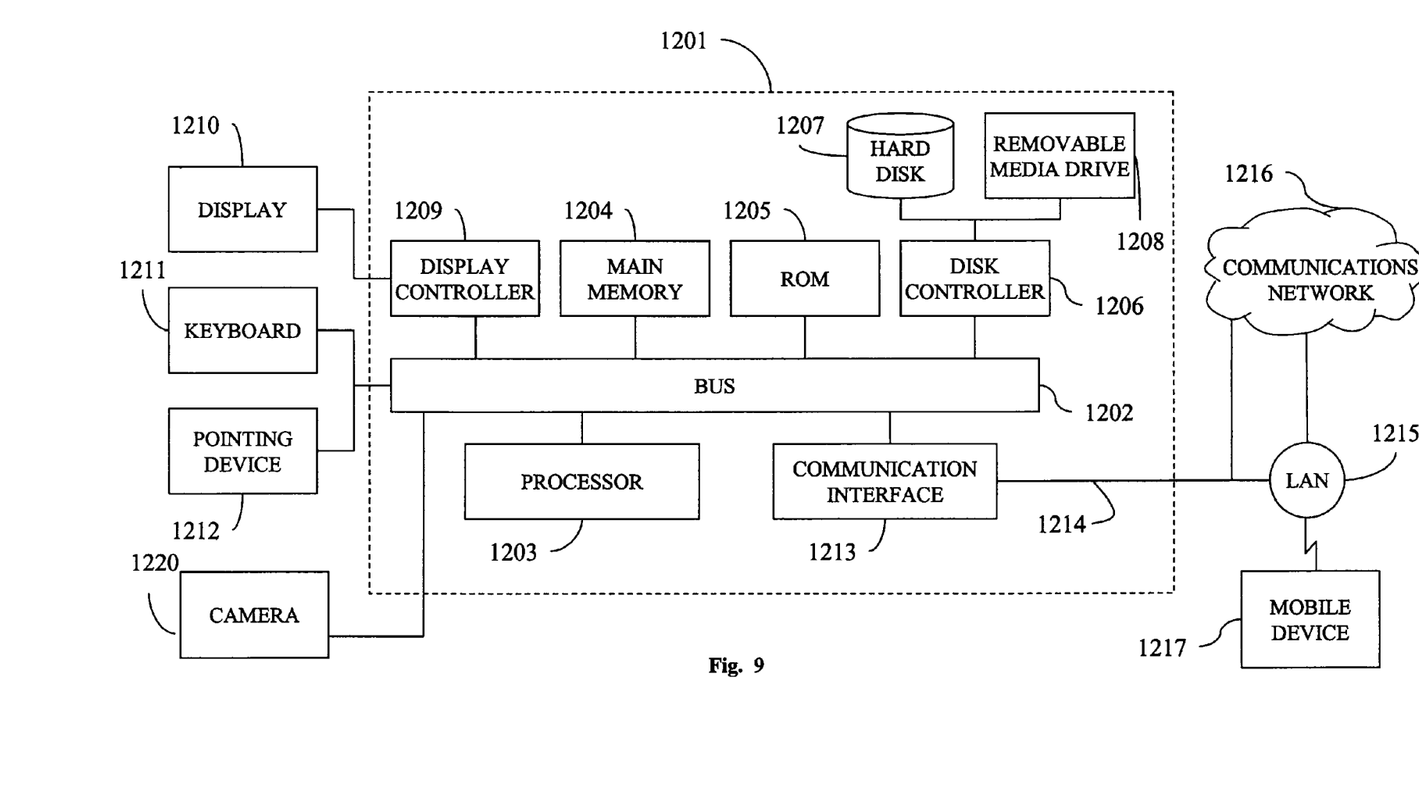
FIG. 9 illustrates an exemplary computer system that may embody the present technical advancement.

FIG. 8 illustrates an exemplary method of suppressing echo. This method may be executed by an audio echo suppression apparatus such as the one shown in FIGS. 4 and/or 9. However, other appropriately programmed machines may also be used. The method of FIG. 8 includes step 700 of receiving the input audio signal $x(n)$ and the microphone signal $y(n)$. This input audio signal may be received from a far end device over a network (such as the internet). Far end devices may include a video conference endpoint, a telephone device, or a PC.

The method of FIG. 8 includes step 702 of generating a input subband signal $X_k(m)$ from the input audio signal $x(n)$ and generating a microphone subband signal $Y_k(n)$. This step may be performed by using analysis filterbanks such as those shown in FIG. 4. The generating of the microphone subband signal may include generating a square magnitude of the microphone subband signal. Alternatively, the generating the microphone subband signal may include generating a smoothed squared magnitude of the microphone subband signal, example of which is given above.

The method of FIG. 8 includes step 704 of delaying the input subband signal $X_k(n)$ with a sequence of one-sample delays to form a plurality of time lag signals. As noted above, an additional delay d may be included. The method of FIG. 8 includes step 706 of, for one or more time lags, computing the magnitude squared of the signal followed by multiplication with a first respective regressor parameter, and taking a sum thereof, to generate a first signal. In one exemplary embodiment, a magnitude squared of all the time lag signals is calculated followed by multiplication with a regressor parameter. In another exemplary embodiment, a magnitude squared of time lag signals is calculated and followed by multiplication with a regressor parameter is done only for selected time lag signals. The selection may be done manually by an administrator based on room response, or automatically by an algorithm.

The method of FIG. 8 includes step 708, calculating a complex product between any pairs of the plurality of time lag signals to generate complex product signals. In one exemplary embodiment, a complex product signal is calculated for every pairing of time lag signals. In another exemplary embodiment, a complex product signal is calculated only for selected pairs of time lag signals. The selection may be done manually by an administrator based on room response, or automatically by an algorithm.

The complex product signal may include a real part and an imaginary part. The method of FIG. 8 includes step 710 of multiplying, at the audio echo suppression apparatus, each of a real part and imaginary part of the complex product signals with second respective regressor parameters, and taking a sum thereof, to generate a second signal. The method of FIG. 8 includes step 712 of generating an estimate of the squared magnitude of the subband echo signal by adding together the first signal and the second signal, creating $|\hat{U}_k(m)|^2$.

The method of FIG. 8 includes step 714 of generating an error signal based on the estimate of the squared magnitude of the subband echo signal $|\hat{U}_k(m)|^2$ and the squared magnitude of the microphone subband signal $|Y_k(m)|^2$. The error signal may be generated by calculating a difference between $|\hat{U}_k(m)|^2$ and $|Y_k(m)|^2$. This error signal may be used to update the first respective regressor parameters and the second respective regressor parameters, by using an adaptive algorithm such as, e.g., NLMS, APA, or RLS.

FIG. 9 illustrates an exemplary computer system 1201 upon which an embodiment of the present technological advancement may be implemented. This computer system may be an audio echo suppression apparatus included in a telephony device, a PC, or a video conference endpoint. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

In an exemplary embodiment, computer system 1201 may perform a portion or all of the processing steps of the method in response to the processor 1203 executing one or more sequences of one or more instructions contained in a memory, such as the main memory 1204. Such instructions may be read into the main memory 1204 from another computer readable storage medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable storage medium or memory for holding instructions programmed according to the teachings of the above-noted embodiments and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. The present technological advancement may also be implemented with an appropriately encoded carrier wave. Stored on any one or on a combination of computer readable storage media, the present technological advancement includes software for controlling the computer system 1201, for driving a device or devices for implementing the above-noted embodiments, and for enabling the computer system 1201 to interact with a human user (e.g., print production personnel). Such software may include, but is not limited to, device drivers, operating systems, development tools, and applications software. Such computer readable media further includes the non-transitory computer readable media that store instructions for performing all or a portion (if processing is distributed) of the processing performed in implementing the technological advancement.

The computer code devices of the present technological advancement may be any interpretable or executable code mechanism, including but not limited to scripts, interpretable programs, dynamic link libraries (DLLs), Java classes, and complete executable programs. Moreover, parts of the processing of the present technological advancement may be distributed for better performance, reliability, and/or cost.

The term "computer readable storage medium" as used herein refers to any tangible medium that participates in providing instructions to the processor 1203 for execution. A computer readable storage medium may take many forms, including but not limited to, non-volatile media, and volatile media. Non-volatile media includes, for example, optical, magnetic disks, and magneto-optical disks, such as the hard disk 1207 or the removable media drive 1208. Volatile media includes dynamic memory, such as the main memory 1204. Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present technological advancement remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The foregoing description of possible implementations and embodiments consistent with the present technological advancement does not represent a comprehensive list of all such implementations or all variations of the implementations described. The description of only some implementations should not be construed as an intent to exclude other implementations. Other embodiments of the technological advancement will be apparent to those skilled in the art from consideration of the specification and practice of the technological advancement disclosed herein. One of ordinary skill in the art will understand how to implement the technological advancement in the appended claims in other ways using equivalents and alternatives that do not depart from the scope of the following claims. It is intended that the specification and examples be considered as exemplary only, with a true scope and spirit of the technological advancement being indicated by the following claims.

The invention claimed is:

1. A method comprising:
receiving, by an audio echo suppression apparatus, an input signal, wherein the input signal is applied to a speaker;
dividing, by the audio echo suppression apparatus, the input signal into a plurality K of subband input signals;
receiving, by the audio echo suppression apparatus, a microphone signal generated by a microphone;
dividing, by the audio echo suppression apparatus, the microphone signal into a plurality K of subband microphone signals;
calculating, by the audio echo suppression apparatus, a squared magnitude of each of the K subband microphone signals;
applying, by the audio echo suppression apparatus, the squared magnitude of the K subband microphone signals and the K subband input signals to a linear regression module;
generating estimates of the squared magnitude of a signal component in the subband microphone signal for each of the plurality K of subbands, wherein the signal component corresponds to sound generated by the speaker in response to the input signal and picked up by the microphone; and
suppressing, by the audio echo suppression apparatus, the signal component in the subband microphone signals based on the estimates of the squared magnitude of the signal component and the squared magnitude of the subband microphone signals to generate a plurality K of subband output signals, wherein
the generating the estimates includes
delaying each subband input signal with a sequence (M−1) of one-sample delay elements to form a plurality M of time lag signals,
calculating a complex product between one or more pairs of the plurality of time lag signals to generate complex product signal or signals, and
multiplying each of a real part and imaginary art of the complex product signal or signals with first respective regression parameters, creating two or more first outputs, and summing said first outputs to generate a first signal.

2. The method according to claim 1, further comprising:
merging the plurality K of subband output signals into one output signal.

3. The method according to claim 1, wherein the signal component comprises an echo signal.

4. The method according to claim 1, wherein the generating the estimates further includes computing a squared magnitude of one or more of the plurality of time lag signals, multiplying the squared magnitude with second respective regression parameters, creating one or more second outputs from the multiplying, and summing said second outputs to generate a second signal.

5. The method according to claim 4, wherein the second signal is the estimate of the squared magnitude of the signal component in the subband microphone signal.

6. The method according to claim 4, further comprising:
adding the first signal and the second signal to create the estimate of the squared magnitude of a signal component in the microphone signal.

7. The method according to claim 6, further comprising:
using all the plurality of time lag signals to generate said second signal and using all possible pairs of the plurality of time lag signals to generate said first signal.

8. The method according to claim 4, further comprising:
estimating the first and second respective regression parameters using an adaptive control algorithm.

9. The method according to claim 4, further comprising:
generating an error signal based on at least one of the first signal, the second signal, and the microphone signal; and
updating the first respective regression parameters and the second respective regression parameters based on the error signal.

10. The method according to claim 4, wherein the calculating the squared magnitude of each of the K microphone subband signals includes calculating a smoothed squared magnitude;
the computing the squared magnitude of one or more of the plurality of time lag signals includes calculating a smoothed squared magnitude; and
the calculating the complex product to generate the complex product signal or signals includes generating smoothed complex product signal or signals.

11. The method according to claim 10, wherein the calculating the smoothed squared magnitude includes multiplying a signal with a first weight parameter ($\gamma$) to form a resulting signal, and adding to the resulting signal, a one sample delayed version of the resulting signal multiplied with a second weight parameter ($1-\gamma$).

12. The method according to claim 1, wherein the first signal is the estimate of the squared magnitude of the signal component in the subband microphone signal.

13. The method according to claim 1, wherein the plurality of subband input signals are delayed with d samples, wherein d∈{0, 1, 2, . . . }.

14. A non-transitory computer readable storage medium encoded with instructions, which when executed by a computer cause the computer to execute a method comprising:
receiving an input signal, wherein the input signal is applied to a speaker;
dividing the input signal into a plurality K of subband input signals;
receiving a microphone signal generated by a microphone;
dividing the microphone signal into a plurality K of subband microphone signals;
calculating a squared magnitude of each of the K subband microphone signals;
applying the squared magnitude of the K subband microphone signals and the K subband input signals to a linear regression module;
generating estimates of the squared magnitude of a signal component in the subband microphone signal for each of the plurality K of subbands, wherein the signal component corresponds to sound generated by the speaker in response to the input signal and picked up by the microphone; and
suppressing the signal component in the subband microphone signals based on the estimates of the squared magnitude of the signal component and the squared magnitude of the subband microphone signals to generate a plurality K of subband output signals, wherein
the generating the estimates includes
delaying each subband input signal with a sequence (M−1) of one-sample delay elements to form a plurality M of time lag signals,
calculating a complex product between one or more pairs of the plurality of time lag signals to generate complex product signal or signals, and
multiplying each of a real part and imaginary part of the complex product signal or signals with respective regression parameters, creating two or more outputs, and summing said outputs to generate a signal.

15. An audio signal processing apparatus, comprising:
a memory; and
a processing device coupled to the memory, which is configured to,
receive an input signal, wherein the input signal is applied to a speaker,
divide the input signal into a plurality K of subband input signals,
receive a microphone signal generated by a microphone,
divide the microphone signal into a plurality K of subband microphone signals,
calculate a squared magnitude of each of the K subband microphone signals,
apply the squared magnitude of the K subband microphone signals and the K subband input signals to a linear regression module,
generate estimates of the squared magnitude of a signal component in the subband microphone signal for each of the plurality K of subbands, wherein the signal component corresponds to sound generated by the speaker in response to the input signal and picked up by the microphone, and
suppress the signal component in the subband microphone signals based on the estimates of the squared magnitude of the signal component and the squared magnitude of the subband microphone signals to generate a plurality K of subband output signals, wherein
the processing device is configured to generate the estimates by
delaying each subband input signal with a sequence (M−1) of one-sample delay elements to form a plurality M of time lag signals,
calculating a complex product between one or more pairs of the plurality of time lag signals to generate complex product signal or signals, and
multiplying each of a real part and imaginary part of the complex product signal or signals with respective regression parameters, creating two or more outputs, and summing said outputs to generate a signal.

16. The audio signal processing apparatus according to claim 15, wherein said audio signal processing apparatus is part of a video conferencing terminal.

* * * * *